G. Pierce.

Horse Rake.

No. 1640.

Reissued. Mar. 22. 1864.

UNITED STATES PATENT OFFICE.

GIDEON PEIRCE, OF ERCILDOUN, PENNSYLVANIA.

IMPROVEMENT IN HORSE-RAKES.

Specification forming part of Letters Patent No. 26,293, dated November 29, 1859; Reissue No. 1,640, dated March 22, 1864.

*To all whom it may concern:*

Be it known that I, GIDEON PEIRCE, of Ercildoun, Chester county, Pennsylvania, have invented a new and useful Improvement in Horse-Rakes; and I hereby declare the following to be a full and exact description of the same, reference being had to the accompanying drawings, making part of this specification.

Figure 1:
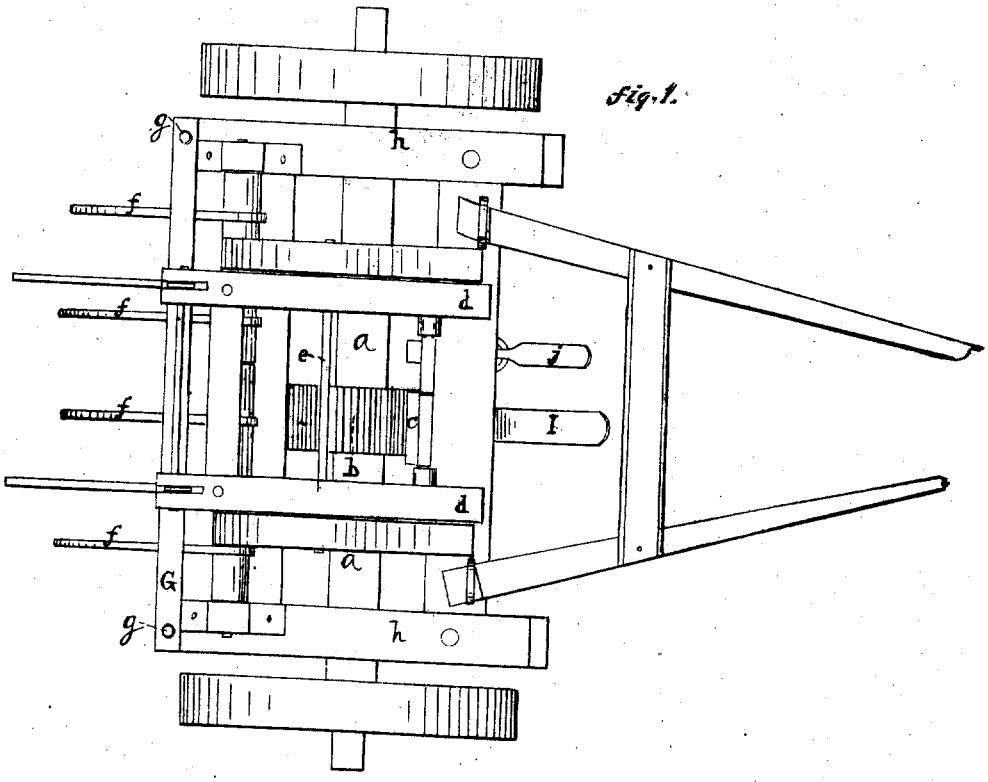
Figure 2:
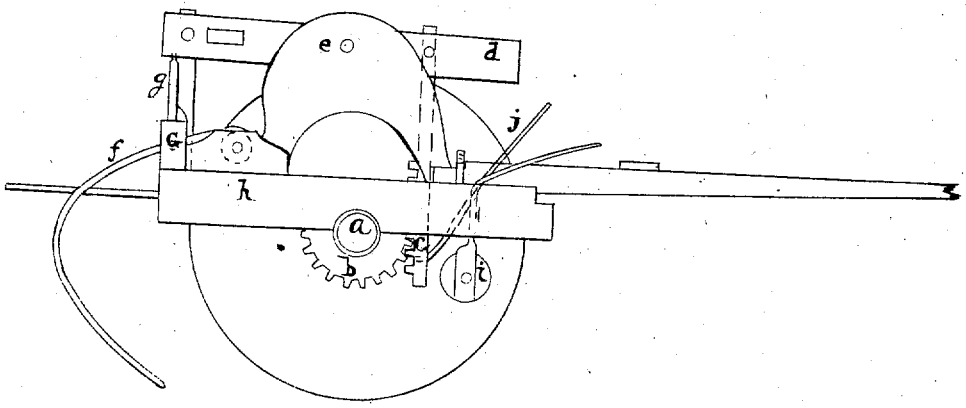

In the accompanying drawings, Figure 1 is a plan of a horse-rake embodying my improvement. Fig. 2 is a side view of the same with one wheel removed.

*a* is an axle without teeth, revolving always with one of the ground-wheels, while it is to work loosely in the other, and carrying upon it a cog-wheel, *b*.

*c* is a vertical rack adapted (in manner hereinafter explained) to be thrown in or out of gear with cog-wheel *b*. The said rack is at its upper end pivoted to a frame, *d*, which frame is pivoted at *e* to standards rising from the main frame *h* of the implement.

*f* are the teeth, attached to the implement in customary manner to admit of being raised at the moment to discharge.

G is a guard or bar provided with mortises, through which the teeth pass. The said bar is attached to the frame *d* so as to be raised or depressed therewith, and works at each end on a small standard rising from the main frame *h* to guide it in a proper path.

I is a lever provided with a friction-pulley, *i*, and employed to press the rack *c* against the cog-wheel *b*.

*j* is a second lever, which, when depressed, exerts an upward pressure on the forward end of the frame *d* in order to keep the teeth firmly down to their work.

K are clearers, of customary construction.

In order to discharge the teeth, it is only necessary to withdraw the foot from the lever *j* and place it upon the lever I. This action, bringing the rack *c* into gear with cog-wheel *b*, causes the said rack to be drawn downward by the motion of the machine, thereby elevating the teeth through the agency of the frame *d* and bar G.

The levers I and *j* may be adapted to be operated by either the foot or hand.

By this invention the driver is relieved from the labor of elevating the teeth by hand. At the same time the draft of the animal is equalized.

I claim as new and of my invention herein and desire to secure by Letters Patent—

The arrangement and combination of the axle *a*, cog-wheel *b*, rack *c*, lever I, frame *d*, bar G, standard *g*, and teeth *f*, operating substantially as and for the purpose set forth.

GIDEON PEIRCE.

Witnesses:

JAMAS B. MODE,
LUKENS PEIRCE.